(12) United States Patent
Blonde et al.

(10) Patent No.: US 10,025,094 B2
(45) Date of Patent: Jul. 17, 2018

(54) OPTICAL SEE-THROUGH GLASS TYPE DISPLAY DEVICE AND CORRESPONDING OPTICAL UNIT

(71) Applicant: THOMSON LICENSING, Issy de Moulineaux (FR)

(72) Inventors: Laurent Blonde, Thorigne-Fouillard (FR); Valter Drazic, Betton (FR); Arno Schubert, Chevaigne (FR)

(73) Assignee: Thomson Licensing (FR)

( * ) Notice: Subject to any disclaimer, the term of this patent is extended or adjusted under 35 U.S.C. 154(b) by 53 days.

(21) Appl. No.: 14/578,416

(22) Filed: Dec. 20, 2014

(65) Prior Publication Data

US 2015/0177517 A1   Jun. 25, 2015

(30) Foreign Application Priority Data

Dec. 20, 2013 (EP) .................................... 13306814

(51) Int. Cl.
*G09G 5/00* (2006.01)
*G02B 27/01* (2006.01)
(Continued)

(52) U.S. Cl.
CPC ....... *G02B 27/0101* (2013.01); *G02B 27/017* (2013.01); *H04N 13/0459* (2013.01);
(Continued)

(58) Field of Classification Search
CPC ..... G09G 2320/0261; G09G 2320/028; G09G 2320/068; G02B 27/01; G02B 27/0101;
(Continued)

(56) References Cited

U.S. PATENT DOCUMENTS

| 5,886,822 A | 3/1999 | Spitzer |
| 6,091,546 A * | 7/2000 | Spitzer ................. G02B 27/017 345/8 |

(Continued)

FOREIGN PATENT DOCUMENTS

| CN | 201926834 | 8/2011 |
| CN | 102955255 | 3/2013 |

(Continued)

OTHER PUBLICATIONS

"Eyetap: The Eye Itself as Display and Camera"; EyeTap Personal Imaging Lab. 2014; www.eyetap.org/research/eyetap.html?; pp. 1-3.

(Continued)

*Primary Examiner* — Alexander Eisen
*Assistant Examiner* — Nelson Lam
(74) *Attorney, Agent, or Firm* — Jack Schwartz & Associates PLLC

(57) ABSTRACT

An optical see-through glass type display device comprises: an optical unit having a front correcting surface and a rear correcting surface; an image projector projecting a virtual image; and an image sensor for capturing an ambient scene image. The optical unit is configured to guide light of the ambient scene image coming through the front correcting surface to the image sensor and to guide light of the virtual image so that the light of the virtual image outgoes through the rear correcting surface. A first optical compensation element is located between the optical unit and the image sensor and a second optical compensation element is located between the image projector and the optical unit. The device further comprises a processing module configured to analyze the ambient scene image captured by the image sensor.

6 Claims, 3 Drawing Sheets

(51) Int. Cl.
*H04N 13/04* (2006.01)
*G02C 7/08* (2006.01)

(52) U.S. Cl.
CPC .. *G02B 2027/011* (2013.01); *G02B 2027/014* (2013.01); *G02B 2027/0134* (2013.01); *G02B 2027/0138* (2013.01); *G02B 2027/0178* (2013.01); *G02C 7/086* (2013.01)

(58) Field of Classification Search
CPC .... G02B 2027/0132; G02B 2027/0134; G02B 2027/0136; G02B 2027/0138; G02B 2027/014
USPC .......................................................... 345/7–9
See application file for complete search history.

(56) References Cited

U.S. PATENT DOCUMENTS

| | | | |
|---|---|---|---|
| 6,945,648 B2 | 9/2005 | Schindler et al. | |
| 7,545,571 B2 | 6/2009 | Garoutte et al. | |
| 7,609,453 B2 | 10/2009 | Moliton et al. | |
| 7,800,827 B2 | 9/2010 | Moliton et al. | |
| 8,018,483 B2 | 9/2011 | Nakanishi | |
| 9,846,302 B2* | 12/2017 | Blonde | G02B 27/0101 |
| 2002/0084950 A1* | 7/2002 | Aoki | G02B 27/0101 345/7 |
| 2003/0058543 A1 | 3/2003 | Sheedy et al. | |
| 2005/0046954 A1* | 3/2005 | Achtner | G02B 3/04 359/630 |
| 2007/0008624 A1 | 1/2007 | Hirayama | |
| 2007/0268316 A1 | 11/2007 | Kajita et al. | |
| 2008/0273246 A1 | 11/2008 | Moliton et al. | |
| 2010/0321409 A1 | 12/2010 | Komori et al. | |
| 2012/0050044 A1* | 3/2012 | Border | A61M 21/02 340/573.1 |
| 2012/0050140 A1 | 3/2012 | Border et al. | |
| 2012/0068913 A1* | 3/2012 | Bar-Zeev | G02B 26/026 345/8 |
| 2012/0081800 A1* | 4/2012 | Cheng | G03B 21/00 359/720 |
| 2012/0147038 A1* | 6/2012 | Perez | G02B 27/0172 345/632 |
| 2013/0021226 A1 | 1/2013 | Bell | |
| 2013/0021658 A1* | 1/2013 | Miao | G02B 27/283 359/256 |
| 2013/0050833 A1* | 2/2013 | Lewis | G06T 7/0042 359/630 |
| 2013/0077049 A1 | 3/2013 | Bohn | |
| 2013/0120224 A1* | 5/2013 | Cajigas | G09G 5/00 345/8 |
| 2013/0194389 A1 | 8/2013 | Vaught et al. | |
| 2013/0242392 A1* | 9/2013 | Amirparviz | G02B 27/0172 359/485.05 |
| 2013/0335302 A1* | 12/2013 | Crane | H04N 5/2354 345/8 |
| 2014/0118225 A1* | 5/2014 | Jerauld | A61B 5/486 345/8 |
| 2017/0148215 A1* | 5/2017 | Aksoy | G06T 19/006 |

FOREIGN PATENT DOCUMENTS

| | | |
|---|---|---|
| JP | 2011002753 | 1/2011 |
| WO | WO9815868 | 4/1998 |
| WO | WO2004001484 | 12/2003 |
| WO | WO2013056187 | 4/2013 |

OTHER PUBLICATIONS

Meister: "Opticamous Lens Design", OptiCampus.com—Continuing Education Course; www.opticcampus.com. 2014, pp. 1-19.
Search Report dated Apr. 15, 2014.

* cited by examiner

OPTICAL SEE-THROUGH GLASS TYPE DISPLAY DEVICE AND CORRESPONDING OPTICAL UNIT

This application claims the benefit, under 35 U.S.C. § 119 of European Patent Application No. 13306814.8, filed Dec. 20, 2013.

TECHNICAL FIELD

The present invention generally relates to an optical see-through glass type display device.

BACKGROUND ART

An optical see-through glass type display device provides a viewer with a virtual image superimposed onto an ambient scene seen through the glass. The virtual image may be projected by a projector and guided into an eye of the viewer via an optical element on the glass. The optical see-through glass type display device may present a stereoscopic virtual image by displaying a left image on the left glass and a right image on the right glass of the device so that the viewer can experience a three-dimensional perception of depth.

In such an optical see-through glass type display device, it is preferable for the viewer to perceive the virtual image in spatial coherence with the ambient scene image even if the device comprises corrective surfaces providing a prescription glasses function in order to present the virtual image on the ambient scene image in proper position and size as well as in proper depth if the virtual image is a stereoscopic virtual image.

EyeTap Personal Imaging (ePI) Lab, a research laboratory from University of Toronto, developed the "EyeTap" technology which combines a display and camera in an eyewear for preserving correspondence between the real world and the virtual world through the use of a flat beam splitter plate. However, this technology is not directed to a situation in which the eyewear comprises prescription glasses.

SUMMARY OF THE INVENTION

According to an aspect of the present invention, an optical see-through glass type display device comprises an optical unit having a front correcting surface and a rear correcting surface; an image projector projecting a virtual image; and an image sensor for capturing an ambient scene image. The optical unit is configured to guide light of the ambient scene image coming through the front correcting surface to the image sensor and to guide light of the virtual image so that the light of the virtual image outgoes through the rear correcting surface. A first optical compensation element is located in a light path between the optical unit and the image sensor and a second optical compensation element is located in a light path between the image projector and the optical unit. The device further comprises a processing module configured to analyze the ambient scene image captured by the image sensor to prepare the virtual image to be provided to the image projector according to the analysis result of the ambient scene image.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

These and other aspects, features and advantages of the present invention will become apparent from the following description in connection with the accompanying drawings in which.

DETAILED DESCRIPTION

In the following description, various aspects of an embodiment of the present invention will be described. For the purpose of explanation, specific configurations and details are set forth in order to provide a thorough understanding. However, it will also be apparent to one skilled in the art that the present invention may be implemented without the specific details present herein.

Figure 1:
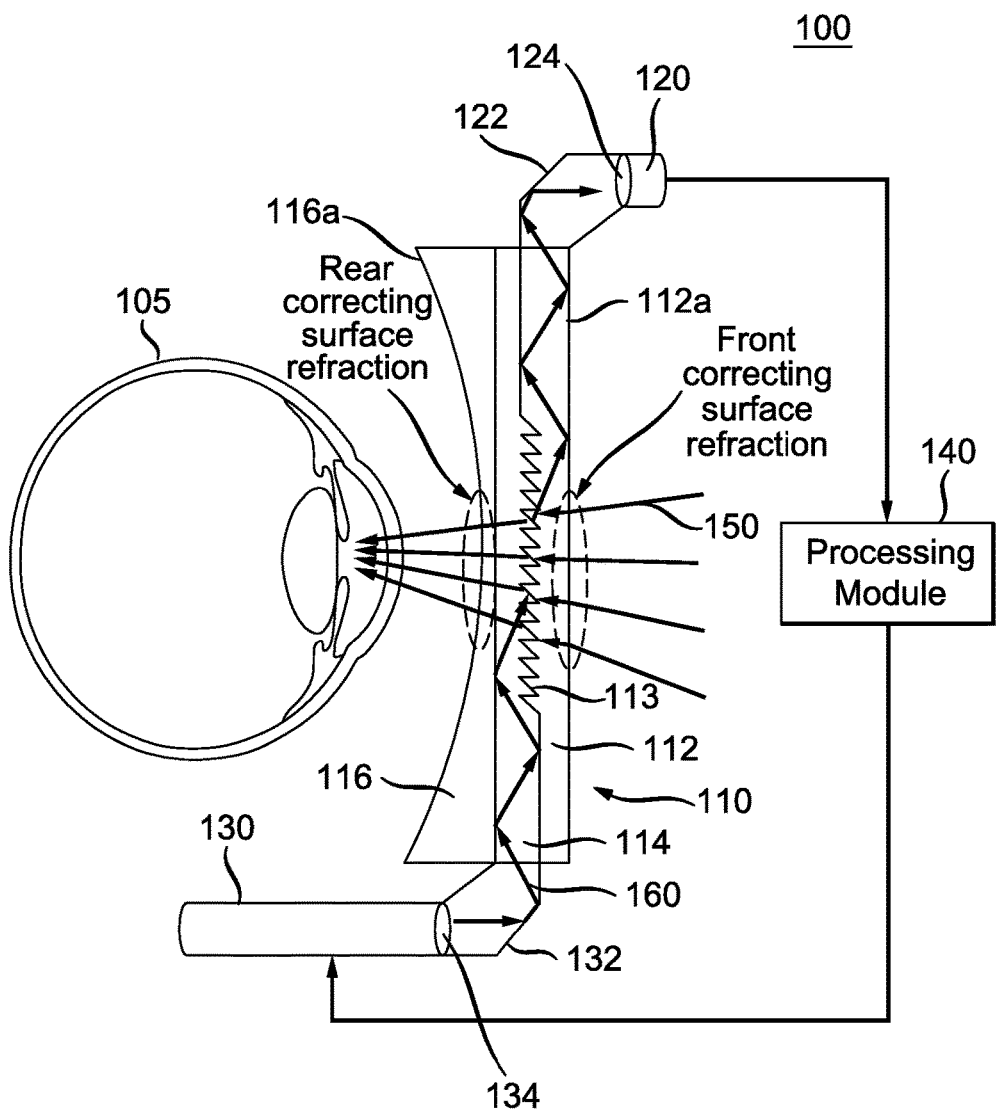
FIG. 1 illustrates a see-through glass type display device according to an embodiment of the present invention.

FIG. 1 illustrates a see-through glass type display device according to an embodiment of the present invention.

As shown in FIG. 1, a see-through glass type display device 100 may include a glass plate unit 110 having a front glass plate 112, intermediate glass plate 114 and rear glass plate 116, an image sensor 120, an image projector 130. The image sensor 120 is optically connected to the front glass plate 112 via a first optical light guide element 122 and the image projector 130 is optically connected to the intermediate glass plate 114 via a second optical light guide element 132. A first optical compensation element 124 is located in a light path between the front plate 112 and the image sensor 120, behind an emission end of the front plate 112. Also, a second optical compensation element 134 is located in a light path between the image projector 130 and the intermediate plate 114, ahead of an incident end of the intermediate plate 114. Details on the optical compensation elements 124 and 134 will be described hereinafter.

The device 100 may be an eye glasses type device, thus the device 100 also comprises a bridge (not shown) connecting two glass plate units each other and temple arms (not shown) that will extend respectively over the ears of a viewer to help hold the device 100 in place. In FIG. 1, only the half components of the device 100 for the right eye 105 of a viewer are illustrated for the simplicity of the illustration.

The front glass plate 112 has a front correcting surface 112a (curvature not depicted in FIG. 1) to be located at ambient scene side for correcting near-sight (myopia) or far-sight (hyperopia) of the viewer. The front correcting surface 112a of the glass plate 112 refracts a light 150 coming from ambient scene when the light comes into the glass plate 112.

The glass plate unit 110 has a separating layer 113 between the front glass plate 112 and the intermediate glass plate 114. The separating layer 113 can have a Fresnel structure, for example. The separating layer 113 has semi-reflective characteristics for reflecting a part of incoming light and for transmitting the other part of the incoming light.

The separating layer 113 will redirect a light beam coming from ambient scene through the front correcting surface 112a of the front glass plate 112 so that the light beam is laterally propagated within the front glass plate 112 by total internal reflection (TIR) between the both surfaces of the plate 112. The light beam propagated within the glass plate 112 will travel to the image sensor 120 via the first optical light guide element 122, then be captured on the image sensor 120. The separating layer 113 is also transmissive for a light coming from ambient scene to travel through the separating layer 113 toward the eye 105 of the viewer.

The image projector 130 is configured to project a virtual image. A light beam of the virtual image projected by the image projector 130 is guided via the second optical light guide element 132 and then comes into the intermediate glass plate 114. The light beam 160 is laterally propagated within intermediate glass plate 114 by total internal reflection (TIR) between both surfaces of the plate 114. Then, at least a part of the light beam is reflected and directed toward the eye 105 of the viewer by the separating layer 113. As a result of this, the virtual image is presented to the viewer.

The rear glass plate 116 behind the intermediate glass plate 114 has a rear correcting surface 116a to be located at viewer's eye side for correcting near-sight (myopia) or far-sight (hyperopia) of the viewer. The rear correcting surface refracts 116a a light outgoing from the rear glass plate 116.

It should be noted that curvatures of the front correcting surface 112a of the front glass plate 112 and the rear correcting surface 116a of the rear glass plate 116 can be predetermined depending on the viewer's vision characteristics, which may be determined in advance through an examination for visual acuity. Also, it should be noted that dimensions, angles and reflection/transmission level of semi-reflection elements of the separating layer 113 may be defined so that the above described light paths for the ambient scene image light and virtual image light are established in the glass plate unit 110. Further, for example, a boundary surface between the front glass plate 112 and the intermediate glass plate 114 excluding the area of the separating layer 113 and a boundary surface between the intermediate glass plate 114 and the rear glass plate 116 may be formed with a transparent resin having lower refraction index than that of glass plates 112, 114 and 116 so that the total internal reflections (TIRs) can be realized within the front glass plate 112 and the intermediate glass plate 114.

The device 100 further comprises a processing module 140 connected to the image sensor 120 and the image projector 130. The module 140 is configured to perform: 1) analysis of ambient scene image captured by the image sensor 120 for specifying a tracked feature in the ambient scene image, for example; and 2) virtual image overlay for providing a virtual image so that the virtual image is presented on the glass plate unit 110 at suitable position and in suitable size according to the position and size of the tracked feature in the captured ambient scene image.

Figure 2:
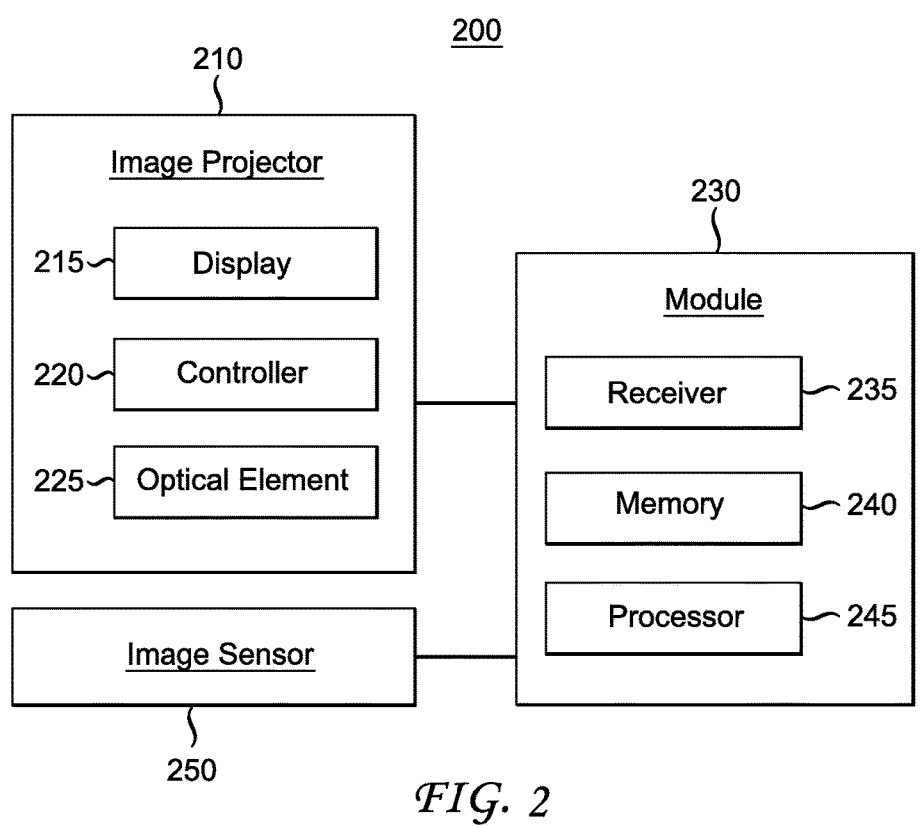
FIG. 2 is a block diagram of components of the see-through glass type display device according to an embodiment of the present invention.

FIG. 2 is a block diagram of components of the see-through glass type display device according to an embodiment of the present invention. As shown in FIG. 2, the components of the device 200 comprise an image projector 210, a processing module 230 and an image sensor 250. The image projector 210 and the image sensor 250 are connected to the module 230 via wired or wireless connections, respectively.

The image projector 210 comprises a display 215 for projecting the virtual image, a controller 220 for controlling the display 215 and an optical element 225 for guiding light from the display 215 to the optical light guide element 132 (FIG. 1). An exemplary implementation of the display 215 can be made by an LCD (Liquid crystal display) and an LED (Light Emitting Diode) RGB light source module.

It should be noted that any other technologies can be employed for implementing the display 215.

The module 230 comprises a receiver 235 and a memory 240. These receiver 235 and memory 240 are configured to receive and store images or videos to be projected as the virtual image, which images or videos are stored in any type of external device (not shown) and received from the external device via a wired or wireless connection and also configured to receive and store the captured ambient scene image from the image sensor 250.

The module 230 further comprises a processor 245. The processor 245 performs analysis of ambient scene image stored in the memory 240 to specify the size and/or position of the tracked feature in the ambient scene image, for example. In an example, the tracked feature may be the viewer's hand outreached in front of the viewer's eyes. The processor 245 also performs virtual image overlay for providing a virtual image so that the virtual image forming beam is presented on the glass plate unit 110 at suitable position and in suitable size according to the position and size of the tracked feature in the captured ambient scene image.

In an example, the processor 245 may determine the size and position of a virtual image to be displayed in the area of the separating layer 113 in the glass plate unit 110 according to the position and size of the tracked viewer's hand in the captured ambient scene image so that the virtual image is superimposed on or adjacent to the tracked viewer's hand in the ambient scene image seen through the glass plate unit 110 and that the virtual image moves on with the viewer's hand. The virtual image can be an image, video, text information or the like received by the receiver 235 and stored in the memory 240. The virtual image to be provided to the image projector 210 is prepared by the processor 245 according to the analysis result of the ambient scene image as described above. Data of the virtual image with adjusted size and position is output by the processor 245 to the image projector 210, then the virtual image with adjusted size and position is projected by the image projector 210.

As discussed above, the analysis of ambient scene image is performed by the processor 245 to specify the size and/or position of the tracked feature in the ambient scene image. The analysis of ambient scene image is needed for the calibration of virtual image to be displayed, therefore the analysis process on the processor 245 and imaging operation on the image sensor 250 may be deactivated or removed once the calibration is established. In case of deactivation those process and operation may be re-activated when size and/or position of a tracked feature in an ambient scene image should be specified again, for example when an ambient scene image and a feature to be tracked are changed. Removal of the image sensor and imaging operation is adequate for consumer usages not needing scene capture. In this case calibration may be performed in e.g. an optician shop with professional equipment. In this case the complexity and cost of the consumer glasses product may be decreased.

Referring to FIG. 1, virtual image light 160 projected by the projector 130 is propagated in the intermediate glass plate 114 and at least part of the virtual image light 160 is redirected toward the eye 105 of the viewer by the separating layer 113. The redirected light reaches the retina in the eye 105, then the viewer will perceive the virtual image superimposed on the ambient scene image seen through the glass plate unit 110. The rear correcting surface 116*a* refracts both ambient scene image light and virtual image light outgoing from the rear glass plate 116.

Figure 3:
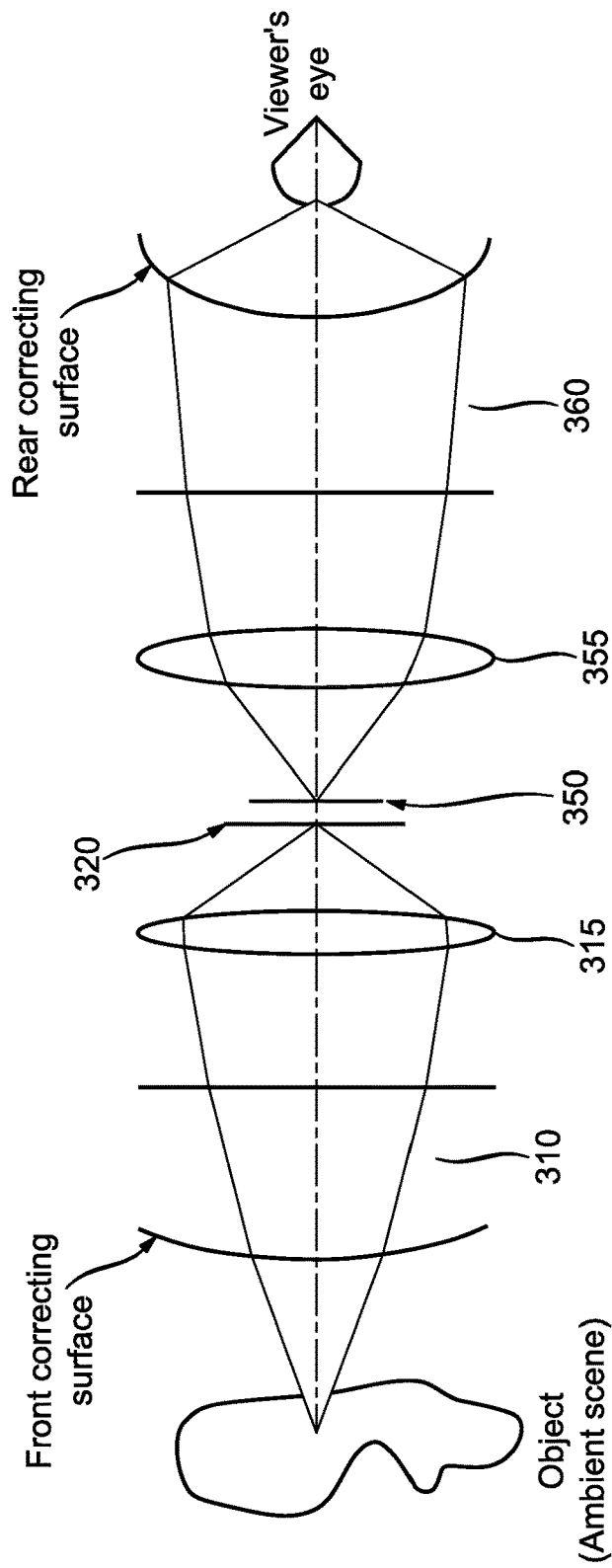
FIG. 3 is a schematic diagram illustrating a first optical path for a light coming from ambient scene and captured by the image sensor and a second optical path for a light projected from the image projector and directed to the eye of a viewer.

FIG. 3 is a schematic diagram illustrating a first optical path for a light coming from ambient scene and captured by the image sensor and a second optical path for a light projected from the image projector and directed to the eye of a viewer. Front glass plate 310, first optical compensation element 315 and image sensor 320 shown in FIG. 3 correspond to the elements 112, 124 and 120 shown in FIG. 1, respectively. Also, image projector 350, second optical compensation element 355, rear glass plate 360 shown in FIG. 3 correspond to the elements 130, 134 and 116 shown in FIG. 1, respectively.

Referring FIGS. 1 and 3, as discussed above, a light coming into the front glass plate 112 is refracted by the front correcting surface 112*a* of the plate 112. Therefore, the ambient scene image, coming into the front glass plate 112, propagated within the plate 112 and captured by the image sensor 120 is deformed (magnified, demagnified or distorted) by the front correcting surface 112*a* of the front glass plate 112. If no compensation is applied to the captured ambient scene image, the ambient scene image is not recognized correctly by the processor 245 in the module 230 (FIG. 2), which would cause miss-positioning or miss-sizing of a virtual image to be output by the processor 245 that results in spatial incoherency between the ambient scene image seen through the glass unit 110 and the virtual image to be superimposed on the ambient scene image. Such compensation might be realized by any kinds of image processing to be performed by the processor 245, but this solution needs a lot of computational costs on the processor 245 and would cause quality loss of the captured ambient scene image due to resampling or interpolation during the image processing.

A different approach, which does not need image processing for compensating the deformation of the captured ambient scene image, is provided by an embodiment according to the invention. In the embodiment, the first optical compensation element 124 is provided at the input end of the image sensor 120. The optical compensation element 124 can be an optical lens or optical surface or the like. The optical compensation element 124 has an optical characteristic which compensate or cancel the deformation of the ambient scene image caused by the front correcting surface 112*a* of the front glass plate 112. The optical characteristic of the optical compensation element 124 may be selected when it is manufactured, based on the optical characteristic of the front correcting surface 112*a* of the front glass plate 112. Thanks to the optical compensation element 124, the image sensor 120 can capture a compensated, "original" ambient scene image formed on the imaging area of the image sensor 120.

Also, as discussed above, a light projected from the image projector 130, propagated within the intermediate glass plate 114 and redirected toward the eye 105 of the viewer by the separating layer 160 is refracted by the rear correcting surface 116*a* of the rear glass plate 116. Therefore, the eye 105 of the viewer sees a virtual image deformed (magnified, demagnified or distorted) by the rear correcting surface 116*a* of the rear glass plate 116. If any compensation is not applied to the virtual image to be presented to the viewer, the viewer would see the virtual image superimposed on the ambient scene seen through the glass plate unit 110 at inappropriate position and/or in inappropriate size, which would cause spatial incoherency between the ambient scene image seen through the glass unit 110 and the virtual image to be superimposed on the ambient scene image. The virtual image might be deformed in advance by image processing in view of the deformation to be caused by the rear correcting surface 116*a*, however this approach needs a lot of computational costs and also would cause quality loss of the virtual image due to resampling or interpolation during the image processing.

In this embodiment, a second optical compensation element 134 is provided at the output end of the image projector 130. The optical compensation element 134 can be an optical lens or optical surface or the like. The optical compensation element 134 has an optical characteristic which compensate or cancel the deformation of the virtual image to be caused by the rear correcting surface 116*a* of the rear glass plate 116. The optical characteristic of the optical compensation element 134 may be selected when it is manufactured, based on the optical characteristic of the rear correcting surface 116*a* of the rear glass plate 116. According to the embodiment, an "original" virtual image projected by the image projector 130 is deformed (magnified, demagnified or distorted) by the optical compensation element 134, then the "deformed" virtual image light is propagated within the intermediate glass plate 114 by total internal reflection (TIR), reflected and redirected toward the eye 105 of the viewer by the separating layer 160 and finally outgoes from the rear glass plate 116 through its rear correcting surface 116*a*. The "deformed" virtual image is restored to the "original" virtual image by refraction to be caused when the "deformed" virtual image light outgoes from the rear correcting surface 116*a*. Thus, the "original" virtual image is presented to the eye 105 of the viewer.

As described above, in FIG. 1, only the half components of the device 100 for the right eye of a viewer are illustrated for the simplicity of the illustration. However, it should be noted that the device 100 may comprise the same components for the left eye of a viewer as illustrated in FIG. 1 in symmetrical manner, which will provide the virtual image to both eyes of the viewer. Alternatively, the device 100 may comprise only a single, simple glass plate and a temple connected to the glass plate, or only an empty frame without a glass plate and a temple connected to the frame, for the left eye of a viewer, which will provide the virtual image to only one eye of the viewer but it would be acceptable to a certain purpose of use.

The glass plate unit 110 has been discussed hereinabove in a context that it comprises three elements of the front glass plate 112, intermediate glass plate 114 and rear glass plate 116. However, it should be noted that the glass plate unit 100 can have any configurations as long as it performs the aforementioned functions of the glass plate unit, which functions may include at least, injection and extraction of the virtual image light, guiding the ambient scene image light and the virtual image light, and visual correction. In this sense, two adjacent plates 112 and 114 and/or two adjacent plates 114 and 116 may be consolidated each other, thus the glass plate unit 110 may have less plates than three plates.

Further, in the aforementioned examples, the ambient scene image light 150 and the virtual image light 160 are guided by the total internal reflection (TIR) within the plates 112 and 114, respectively. It should be noted that the glass plate unit 110 may be configured to guide at least one of the lights 150 and 160 with different approach than the TIR approach. For example, the ambient scene image light 150 reflected on the separating layer 113 may be directly condensed on the image sensor 120 through the first optical compensation element 124 and/or the virtual image light 160 projected from the image projector 130 and passed through the second optical compensation element 134 may be directly applied to the separating layer 113.

Yet further, in one embodiment of the invention, the glass plate unit 110 may comprise, instead of the separating layer 113, an array of reflective mirror elements that are positioned in such way that a gap between at least two of the elements exists. In another embodiment of the invention, the glass plate unit 110 may comprise, instead of the separating layer 113, an array of semi-reflective mirror elements that are also spaced out each other in such way that a gap between at least two of the elements exists. Such a gap enables an external light to go through it.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention.

The invention claimed is:

1. An optical see-through glass type display device, comprising:
   an optical unit having a front correcting surface and a rear correcting surface, the front correcting surface refracting light from an ambient scene image;
   an image projector projecting a virtual image; and
   an image sensor,
   wherein the optical unit is configured to guide light of the ambient scene image refracted by the front correcting surface to the image sensor and to guide light of the virtual image so that the light of the virtual image outgoes through the rear correcting surface,
   wherein a first optical compensation element is located in a light path between the optical unit and the image sensor behind an emission end of the optical unit to compensate for deformation in the ambient scene image due to the front correcting surface and a second optical compensation element is located in a light path between the image projector and the optical unit ahead of an incident end of the optical unit to compensate for deformation in the virtual image due to the rear correcting surface, and
   wherein the optical see-through glass type display device further comprises a processing module connected to said image projector and image sensor, said processing module being configured to analyze the ambient scene image received by the image sensor to adjust the image projector to prepare the virtual image to overlay the ambient scene image according to the analysis result of the ambient scene image.

2. The display device according to claim 1, wherein the processing module is configured to specify a tracked feature in the ambient scene image by the analysis of the ambient scene image and to prepare the virtual image according to a size and position of the tracked feature.

3. The display device according to claim 1, wherein the first optical compensation element has an optical characteristic to compensate a deformation of an image caused by the front correcting surface and the second optical compensation element has an optical characteristic to compensate a deformation of an image to be caused by the rear correcting surface.

4. The display device according to claim 1, wherein the optical unit comprises a separating layer, the separating layer is configured to reflect a part of an incoming light and to transmit a part of the incoming light.

5. The display device according to claim 1, wherein the optical unit including a front plate having the front correcting surface, a rear plate having the rear correcting surface and an intermediate plate arranged between the front and rear plates.

6. The display device according to claim 5, wherein the first optical compensation element is located in a light path between the front plate and the image sensor and the second optical compensation element is located in a light path between the image projector and intermediate plate.

* * * * *